United States Patent [19]

Baghdady

[11] Patent Number: 5,339,334
[45] Date of Patent: * Aug. 16, 1994

[54] METHOD AND APPARATUS FOR DIVERSITY RECEPTION

[76] Inventor: Elie J. Baghdady, 21 Overlook Dr., Weston, Mass. 02193

[*] Notice: The portion of the term of this patent subsequent to Jul. 7, 2007 has been disclaimed.

[21] Appl. No.: 811,292

[22] Filed: Dec. 20, 1991

Related U.S. Application Data

[62] Division of Ser. No. 400,769, Aug. 30, 1989, Pat. No. 5,128,969.

[51] Int. Cl.⁵ .................. H04B 7/10; H04L 1/02
[52] U.S. Cl. .................. 375/100; 455/139; 348/469
[58] Field of Search .......... 375/100, 114, 40; 455/137, 273, 135, 136, 138, 139; 370/105.1; 328/154; 358/139, 189, 148, 153; 348/469

[56] References Cited

U.S. PATENT DOCUMENTS

| | | | |
|---|---|---|---|
| 3,555,427 | 1/1971 | Hatton | 325/306 |
| 4,015,205 | 3/1977 | Ikeda et al. | 375/100 |
| 4,052,670 | 10/1977 | Watanabe et al. | 375/118 X |
| 4,349,914 | 9/1982 | Evans | 375/40 |
| 4,513,249 | 4/1985 | Baghdady | 328/150 |
| 4,733,402 | 3/1988 | Monsen | 375/100 |
| 5,128,969 | 7/1992 | Baghdady | 375/100 |

Primary Examiner—Tesfaldet Bocure
Attorney, Agent, or Firm—Burns, Doane, Swecker & Mathis

[57] ABSTRACT

The disclosure relates to methods and apparatus for combining a multiplicity of diversely received replicas of a signal originating in the same remote transmitter. The disclosed methods and apparatus apply, in particular, to digitally modulated sinusoidal prime-carriers or subcarriers, and base the final decision about which of the code alphabet symbols is present in each bit-symbol time slot on either: a) the maximum value of a decision index for each code alphabet letter indicated in/for the same bit time-slot by parallel bit-by-bit detection of the diverse replicas of the signal, the decision index being defined as a function only of the pre-video (IF carrier or subcarrier) signal-to-noise power ratios of the various signal replicas that yield the same code alphabet letter; or on b) bit-by-bit detection of the maximal ratio combination of the video (or pre-bit-detection) bit-stream waveforms out of the prime-carrier or subcarrier exponent (i.e., phase or frequency) demodulators.

16 Claims, 15 Drawing Sheets

METHOD AND APPARATUS FOR DIVERSITY RECEPTION

This application is a division of U.S. patent application no. 07/400,769, Aug. 30, 1989, now issued as U.S. Pat. No. 5,128,969 on Jul. 7, 1992.

BACKGROUND OF THE INVENTION

This disclosure relates to methods and apparatus useful for operating on a multiplicity of diversely (or, as is commonly known in the art, diversity) received replicas of a signal originating in the same remote transmitter to effect a process of digital detection that combines estimates of essential characteristics of said replicas to achieve a lower average probability of bit error than is possible with any of the replicas separately. In essence, the so-called diversity combining digital detection technique according to this invention compares the diversely received replicas of the signal on the basis of quantitative measures of wanted signal and attendant unwanted interfering signal and noise power of energy, and, after compensating for differences in their times of arrival, employs the results to effect a final bit-by-bit decision process based on selected groupings of preliminary signal replica-by-replica bit decisions, or on controlled weighted combinations of the video-band bit-stream waveforms of the various signal replicas.

The diversity receiving and combining technique according to this invention operates on a set of diversely received replicas of a digitally modulated sinusoidal prime-carrier or subcarrier, illustrated in this disclosure in terms of binary code frequency or phase modulated sinusoid, commonly designated in the art as PCM/FM for pulse-code modulation (PCM) on a frequency-modulated carrier, or as PCM/$\phi$M for PCM on a phase modulated carrier, and delivers an output PCM stream with the least bit error rate (BER) or probability possible from the combination of replicas in the set. In order to achieve this result, said combining technique comprises three essential operations:

1) Measurement of Signal Quality (SQM) in terms of a measurable that is reliably/consistently and monotonically indicative or the bit error rate;

2) Time Alignment of (differently delayed) Replicas of the PCM Bit Stream;

3) Merging of the Time-Aligned Replicas of the Bit Stream into one bit stream characterized by the least error rate achievable from the combination.

Candidate measurables considered for signal quality evaluation include:
i) Direct indicators:
Bit Error Rate (BER)
Decoded Data Quality Measurables
Pre-detection Signal-to-Noise Ratio (IF SNR)
Carrier Baseband SNR
PCM Videoband SNR
Bit Waveform Characteristics (Bit Time or/and Amplitude Jitter)
ii) Indirect indicators:
AGC
Offband Noise
Noise at PCM Spectral Zeros The indirect indicators are readily discarded as being not reliably indicative of the BER, and hence inadequate for formulating a consistent diversity signal combining/selection process.

It is therefore an object of this invention to provide a diversity signal combining/selection method based on a signal quality indicator that is reliably monotonically indicative of the bit error rate (BER).

Among the direct indicators,

Direct measurement/counting of bit error rate (BER) requires a priori knowledge of the correct prefixed bits (i.e., parity bits, word sync bits, frame sync bits, ID bits). As overhead bits, prefixed bits reduce the efficiency of telemetry link capacity usage. Therefore, the ratio of a priori known prefixed bits to total number of bits in a given period of time is usually made as small as possible. This ratio, together with the desire to achieve a BER on the order of $10^{-6}$, combines to require inordinately excessive measurement times, completely incompatible with an essential requirement for on-line, "real-time" evaluation of a signal quality.

It is therefore a further object of this invention to base the diversity signal combining/selection on a method of signal quality evaluation that enables reliable inference of the value of average BER without requiring direct counting of bits in error in a test code word, whether separate, or present in the actual PCM stream as for example for frame synchronization purposes.

The direct measurement of SNR of a PCM bit stream breaks down under conditions of relatively poor signal because one of its key component operations becomes erratic when the pulse time jitter becomes a significant fraction of the pulse width. This is PCM videoband SNR and in essence is also the carrier baseband SNR in PCM/FM and PCM/$\phi$M. Bit waveform characteristics, including bit time jitter and bit amplitude fluctuations, provide alternative ways to measure the bit stream SNR. These measures of signal quality have (with some simplifying assumptions) a limited range in which they can be considered correct and sufficient indicators of BER value.

It is therefore yet a further object of the present invention to base the evaluation of signal quality on robust measurements (i.e., measurements that are insensitive to signal waveform distortion in the transmission medium and/or in the receiving equipment, as well as to the noise characteristics relative to the signal) over a wide dynamic range of signal relative to noise energy.

Bit error probability can be shown to be expressible, for IF SNR of 4 dB or greater, as $$P_e \simeq (1/2)\exp\{-(S/N)_{if}/2\},$$
for PCM/FM $$\simeq (1/2\sqrt{\pi}) \cdot \{1/\sqrt{(S/N)_{if}}\}\exp\{-(S/N)_{if}\},$$
for PCM/$\phi$M Thus, in either case, the BER can be computed directly from the measured value of IF SNR, and is a monotonically decreasing function of it. Moreover, if a subset of the received signal replicas shows one of the binary symbols in a particular bit time slot, and the remaining replicas show the other binary symbol, then the probability that either of the two subsets will be jointly in error is given by the product of the bit error probabilities of the members of the subset. Therefore, if we add the measured values of IF SNR for each subset, the one with the greater sum will be less likely to be in error. As a result, a bit-by-bit decision based on the greater of the sums of IF SNR's during each bit time will guarantee a merged bit stream with the lowest achievable BER from the combination of diversely received replicas of the signal. For these reasons, and for the all-important reason that the IF SNR is readily and quickly measurable, the IF SNR has been chosen here as the prime indicator of the BER in the combiner method and apparatus of this invention. The value of $P_c$ inferred from a measurement of $(S/N)_{if}$ applies to all bit decisions within the time interval taken by each evaluation of $(S/N)_{if}$.

It is therefore yet a further object of this invention to provide a method of measuring pre-demodulation prime-carrier or subcarrier signal-to-noise ratio, $(S/N)_{if}$, that is insensitive to frequency and/or amplitude modulation.

It is yet a further object of this invention to provide a diversity combining decision process that bases the final bit-by-bit decision on a set of decision indices, one corresponding to each code alphabet letter, each defined during each bit-symbol waveform time slot as a function solely of a subset of measured $(S/N)_{if}$'s of replicas of the signal.

Prior art PCM stream time-phase alignment techniques are generally based on tapped digital delay lines, which introduce quantized compensatory delays to bring corresponding frame sync pulses into very approximate time coincidence, to within a $\pm 1/(2M)$ bit transient at each switchover between bit streams. The selection of M can be made to hold the transient maximum amplitude to a tolerable value if the switchovers are postulated to have some minimum period. Since M represents the number of clock phases necessary and each clock phase requires gating and gating control signals, the hardware complexity increases as M is increased. The storage capacity required is given by the product (Bit Ram)×(Number of Bit Streams)×(Maximum Delay Difference, or Delay Spread). The power required to keep this number of bits moving at the bit rate through a dynamic storage structure such as a shift register is, in itself, significant.

It is therefore a further object of this invention to provide a time-phase alignment method that is not dependent on quantized-delay increments to achieve near-perfect alignment of the PCM streams.

These and other objects and features of this invention will become apparent from the claims, and from the following description when read in conjunction with the accompanying drawings.

DETAILED DESCRIPTION

Figure 1:
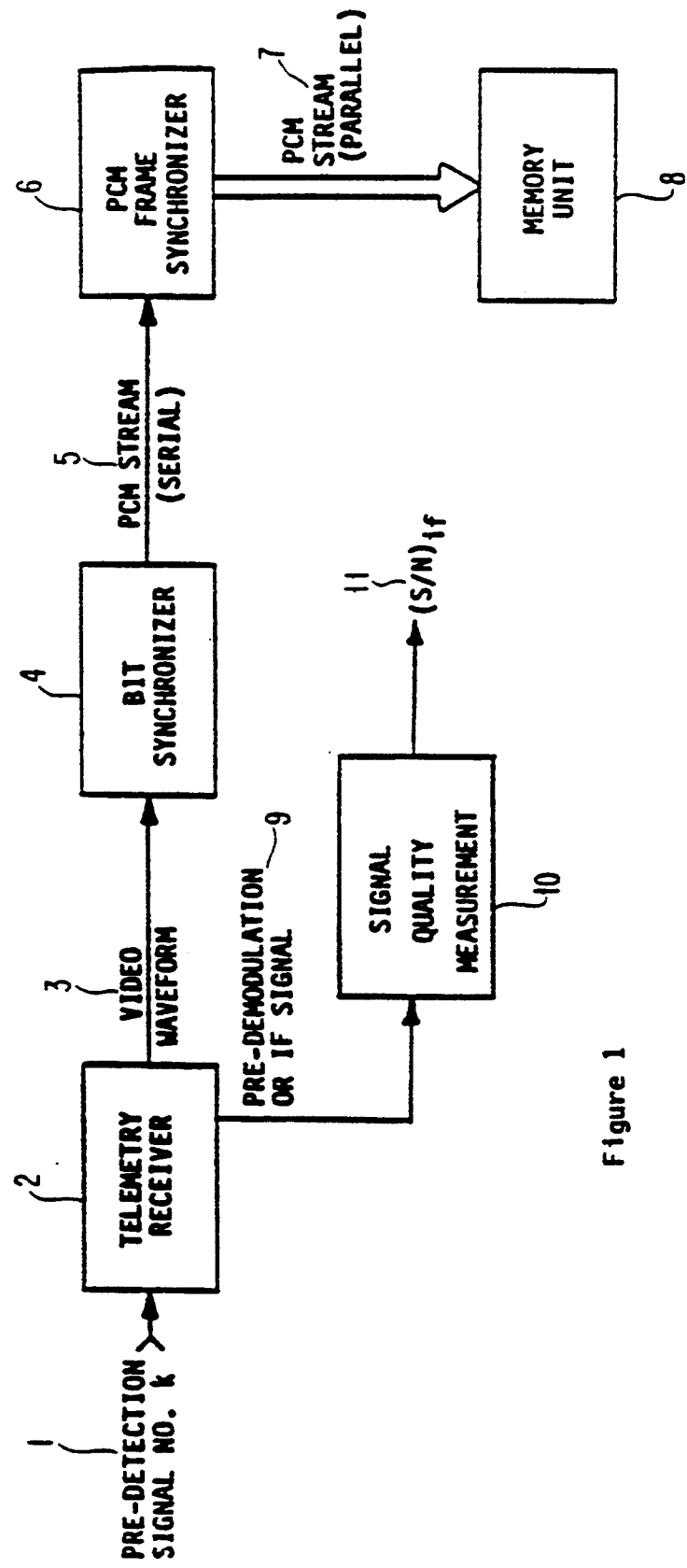
FIG. 1 is an illustrative functional block diagram of a PCM diversity combining receiving system according to this invention.

In an illustrative embodiment of this invention, shown in FIG. 1, the input signals, 1, are first carrier-demodulated down to videoband, 3, after which bit decisions for each channel are made in the bit synchronizers 4. The resulting serial PCM streams 5, are applied to frame synchronizers, 6, where cross-correlational detection identifies the exact time of the start of each new frame. Frame synchronization pulses are thus generated, one for each channel, and the PCM stream 7 in each channel is docked into the channel Memory Unit 8, as illustrated in FIG. 1. The frame sync pulses each channel identify the beginning of each frame. The "time" of this beginning is converted to the start of a "space" frame by reading the first word after the frame sync pulse into memory address word "O" for each channel. In this way, each data word in one frame of memory corresponds identically, bit for bit, with the presumed same dam words in the same address location for the other channels.

The pre-demodulation PCM carrier or PCM subcarrier 9 signal-to-noise power ratio 11, is measured IN 10 separately for each diversity signal replica. A diversity combining bit-by-bit final-decision process is then implemented. In this process, signal replica outputs delivered by bit synchronizers are first aligned in time-phase, and the contents of each bit time slot are then compared across the parallel rows of PCM bits in order to partition the set into subsets of replicas that yield the same code alphabet letter. For each such subset, a decision index is then formulated from the sum of the negatives of the natural logarithms of the applicable expression for the average probability of bit error in each member of the subset. For PCM/FM, such a decision index turns out to be the sum of the values of the signal-to-noise power ratios of the member signal replicas prior to demodulation of the carrier down to video-band. For PCM/$\phi$M, the decision index as just defined is given by the sum of signal-to-noise power ratios and of one-half of the sum of the natural logarithms of these ratios. The bit-time-slot content of the set with the largest value of decision index is declared as the code letter with the least probability of being in error.

The evaluation of the pre-demodulation signal-to-noise power ratio for each of the diversity signal replicas is the first distinctive operation of this invention. Said operation, as we shall shortly describe, generally requires stripping the signal of such frequency and amplitude modulation as it may carry in the pre-demodulation intermediate-frequency (abbreviated throughout by IF on a main line, and by "if" in subscripts) output. Modulation-stripping methods generally applicable to the present invention have been described in Baghdady U.S. Pat. No. 4,513,249, and are included here by reference.

Detailed block diagrams of IF S/N ratio measuring structures will now be described, with reference to FIGS. 2, 3, 4, 5, 6 and 7.

Figure 2:
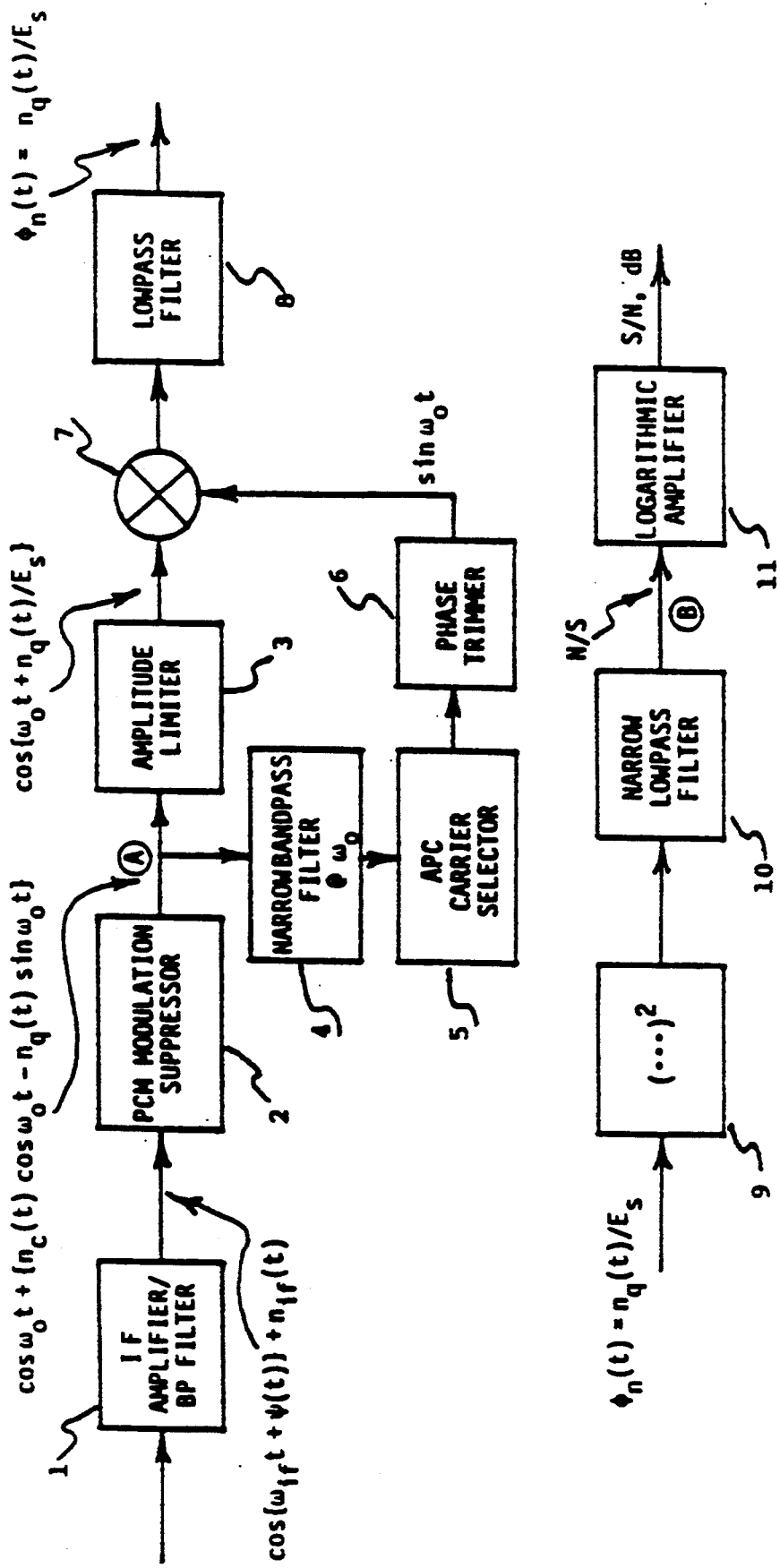
FIG. 2 is a block diagram of a method of measuring $(S/N)_{if}$ according to this invention.

In FIG. 2, the PCM/FM or $\phi$M signal is first reduced to practically a single spectral line (or sinewave $E_s\cos\omega_o t$) that carries the entire signal power by operation 12 aimed at suppressing the PCM modulation. Once this is achieved, the sum of the signal-power carrying sinewave and the attendant IF noise, expressible as $$E_s \cos \omega_o t + n_{if}(t) = E_s \cos \omega_o t + \{n_c(t) \cos\omega_o t - n_q(t) \sin \omega_o t\} \alpha E_s\{1 + n_c(t)/E_s\} \cos \{\omega_o t + n_q(t)/E_s\} \quad (1)$$

is subjected to a bandpass amplitude limiter operation 13 to obtain, approximately, $$\cos \{\omega_o t + n_q(t)/E_s\}, \ S/N > 7 \text{ dB} \quad (2)$$

As indicated in Eq. (2), the approximations in Eqs. (1) and (2) are subject to the assumption of relatively weak noise.

In parallel with the bandpass amplitude limiter operation, the VCO of an automatic phase control (APC) loop 15 is locked to the frequency of the signal-power carrying sinewave essentially in phase quadrature with the $\cos \omega_o t$ component at the limiter output. The frequency-locked and phase-adjusted VCO signal, denoted $\sin\omega_o t$ in FIG. 2, is multiplied with the limiter output in 17, yielding $$2 \sin \omega_o t \cos \{\omega_o t + n_q(t)/E_s\} \alpha - n_q(t)/E_s + \sin \{2\omega_o t + n_q(t)/E_s\} \quad (2)$$

The second term on the right-hand side is suppressed by the lowpass filter 18, leaving $n_q(t)/E_s$. Squaring and averaging $n_q(t)/E_s$, in 19 and 20 of FIG. 2, yields $$\overline{n^2_q(t)}/E^2_s = 2N/(E^2_s/2) = 2/(S/N) \quad (3)$$

where we have made use of the fact that $$\overline{n^2_q(t)} = \text{Average Noise Power}$$

and $$E^2_s/2 = S = \text{Average Signal Power}$$

The logarithm of the right-hand side of Eq. (3) can be calibrated, 21, to read S/N in dB, or the corresponding value of average bit error rate (BER)/probability.

Figure 3:
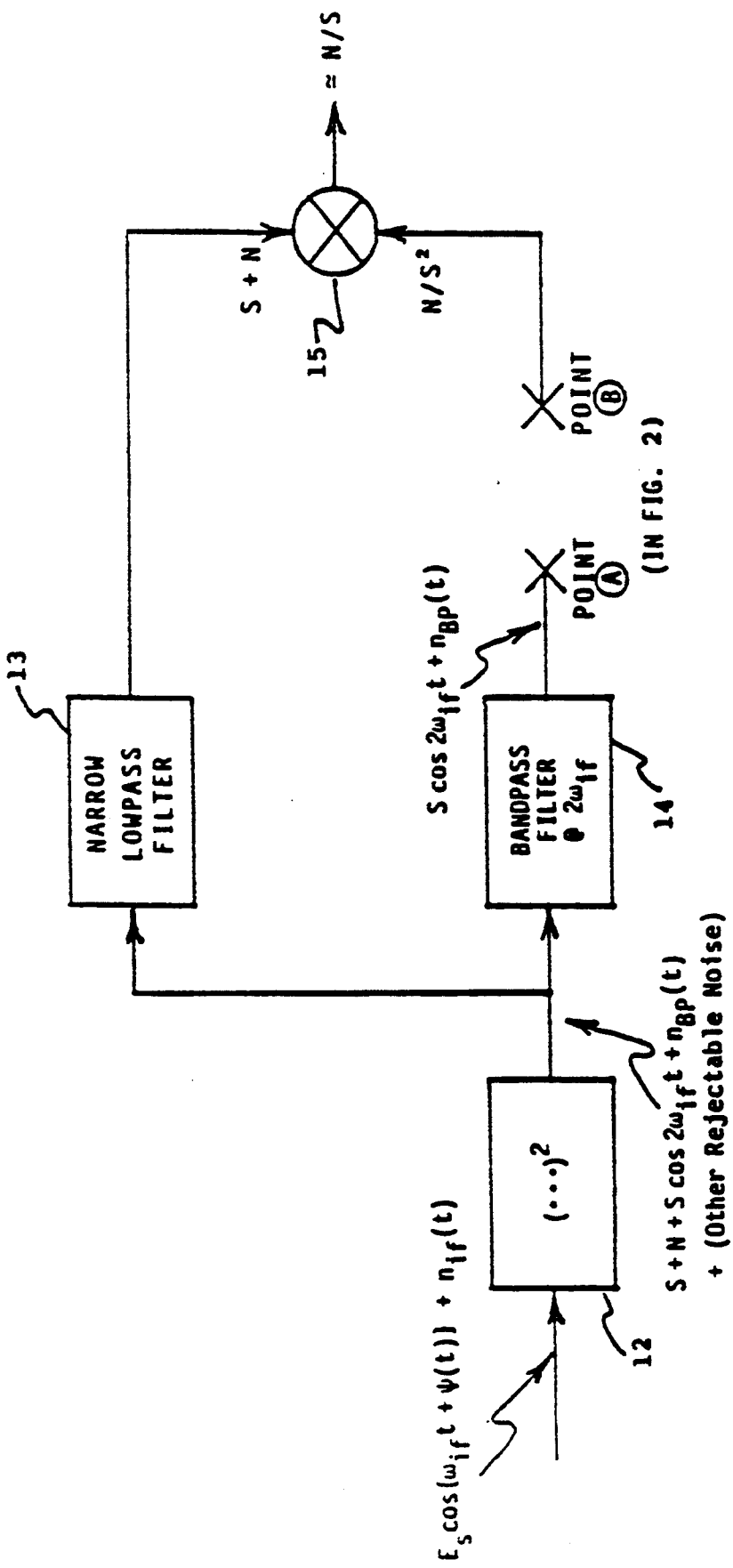
FIG. 3 is an embodiment of a method of measuring $(S/N)_{if}$ according to this invention for one type of digital-modulated sinusoidal signal.

The PCM Modulation Suppressor, 12, FIG. 2, takes the form shown in FIG. 3 for PCM/$\phi$M. The square of such a signal in 22 yields $$(E^2_s/2) + N + (E^2_s/2) \cos 2\omega_{if} t + n_{BP}(t) \quad (4)$$

where $n_{BP}(t)$ is bandpass noise centered at $2\omega_{if}$. Thus, the Lowpass Filter 23 in FIG. 3 yields $$S + N \quad (5)$$

The Bandpass Filter, 24 in FIG. 3, yields $$S \cos 2\omega_{if} t + n_{BP}(t) = S \cos 2\omega_{if} t + n_c(t) \cos 2\omega_{if} t - n_q(t) \sin 2\omega_{if} t \alpha S\{1 + n_c(t)/S\} \cos \{2\omega_{if} t + n_q(t)/S\} \quad (6)$$

Accordingly, $$\overline{n^2_q(t)}/S^2 = N/S^2 \quad (7)$$

The product of (5) and (7) in 25, FIG. 3, is $$N/S + N^2/S^2 \alpha N/S \text{ for } S/N > 10 \text{ dB} \quad (8)$$

Again this result can be presented as a numeric, or converted to dB's or to an average bit error rate (BER)/probability reading.

With PCM/FM, the modulation suppression and IF S/N ratio measurement can be implemented in a number of effective ways, some of which (Baghdady, U.S. Pat. No. 4,513,249) are somewhat sensitive to amplitude modulation in the resultant applied signal (due perhaps to FM-to-AM conversion in the input stages or/and to multipath or to propagation through rocket exhausts) and to dynamic range limitations (significant degrees of saturation) in the receiver input stages. Methods that are not so sensitive to such problems are illustrated in FIGS. 4 and 5.

Figure 4:
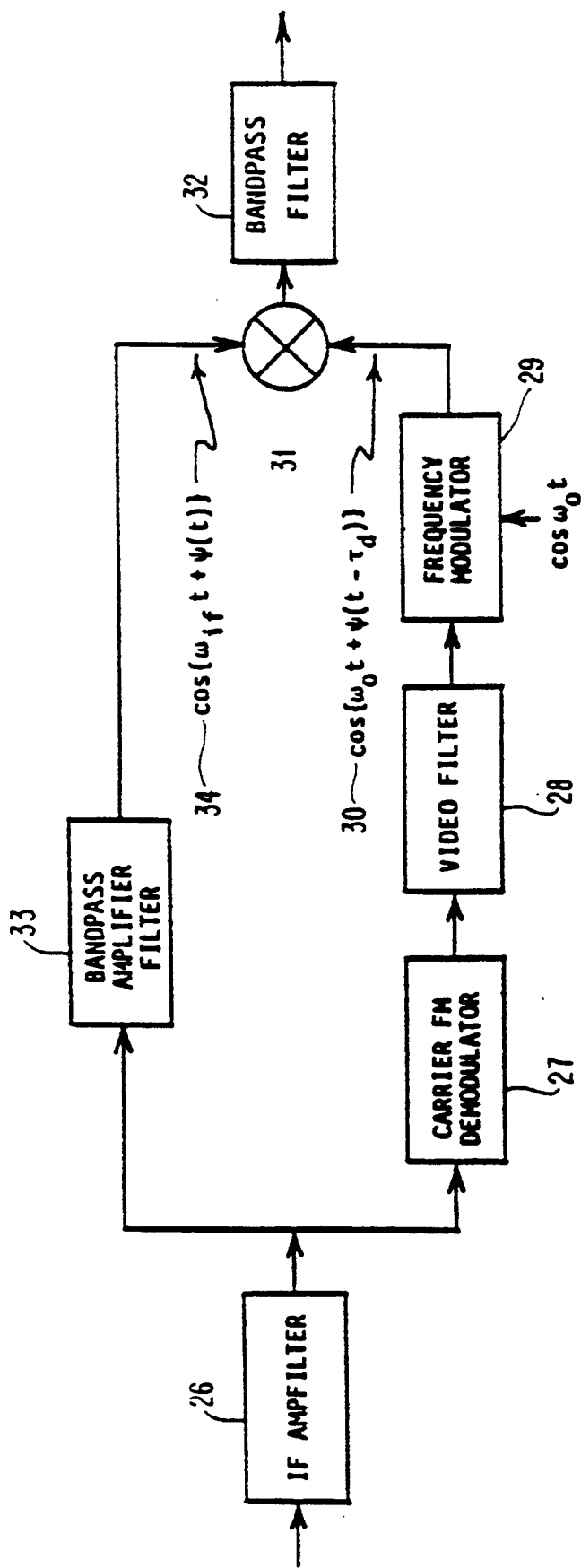
FIG. 4 is a block diagram of a key functional part of a method for measuring $(S/N)_{if}$ according to this invention for one type of digital-modulated sinusoidal carrier.

The method in FIG. 4 is a feedforward approach that proves adequate to the task, because absolute accuracy in the cancellation of the frequency hops due to PCM is not absolutely necessary. The PCM/FM is first demodulated by means of 27 and 28, then regenerated in 29, in the lower branch, to be used as a synchronous PCM/FM local oscillator (LO) 30 to effectively subtract out or greatly suppress the frequency jumps by beating it in 31 and 32 with the signal 34 channeled through the upper branch, 33.

Figure 5:
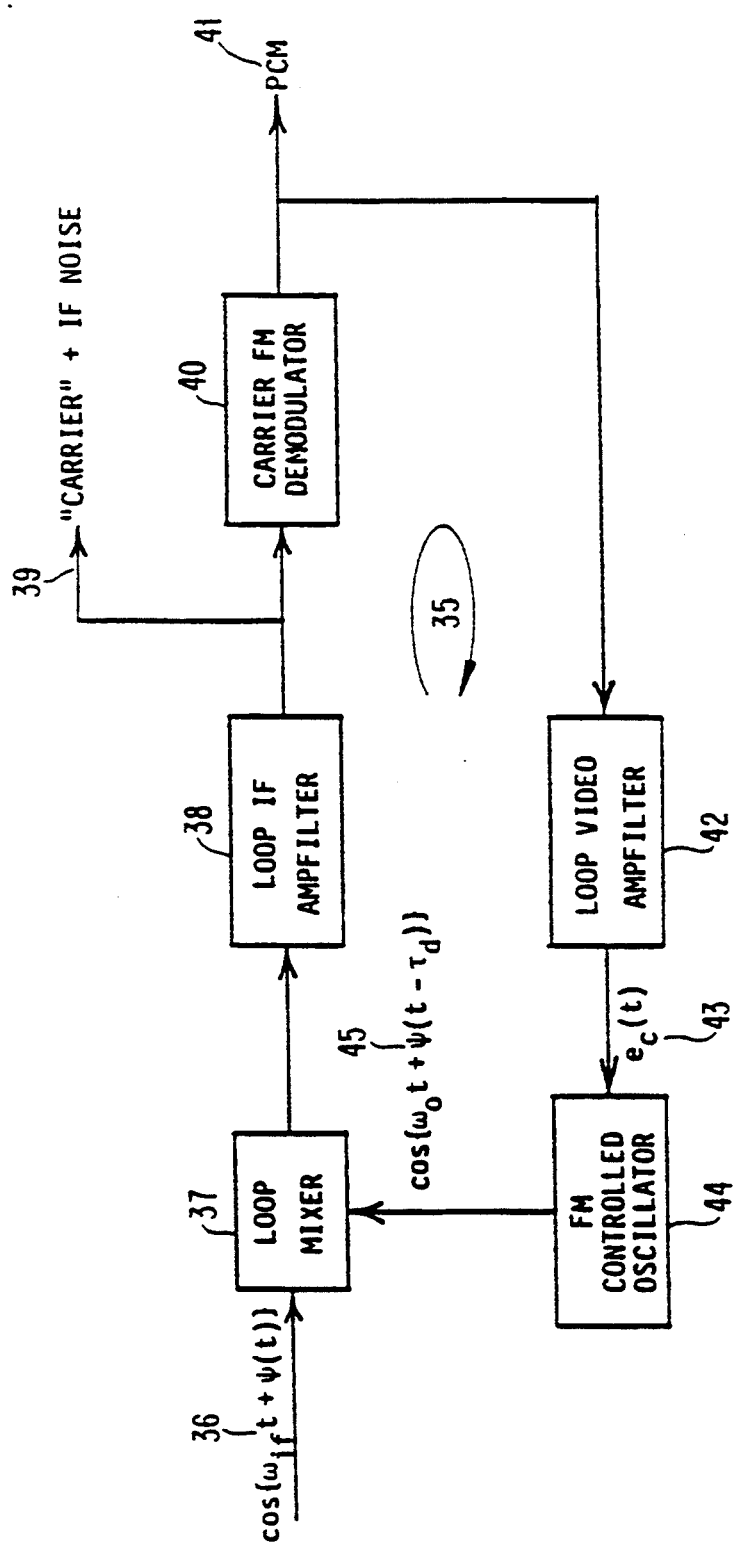
FIG. 5 is a block diagram of an alternative embodiment of a key functional part of a method for measuring $(S/N)_{if}$ according to this invention.

The method in FIG. 5 employs a frequency modulation compressive (FMC) feedback loop 35 to regenerate the PCM/FM signal 36 as 45 in a modulation-controlled, 42 LO, 42. This method can be designed to realize a significant noise threshold advantage over the method of FIG. 4.

In each of the PCM/FM subtractive methods of FIGS. 4 and 5, the effect of transients, if any, at the frequency transitions can be either made negligible by design, or can be eliminated by gating in (or sampling) only the "steady-state" intervals of the signal after modulation subtraction.

Figure 6:
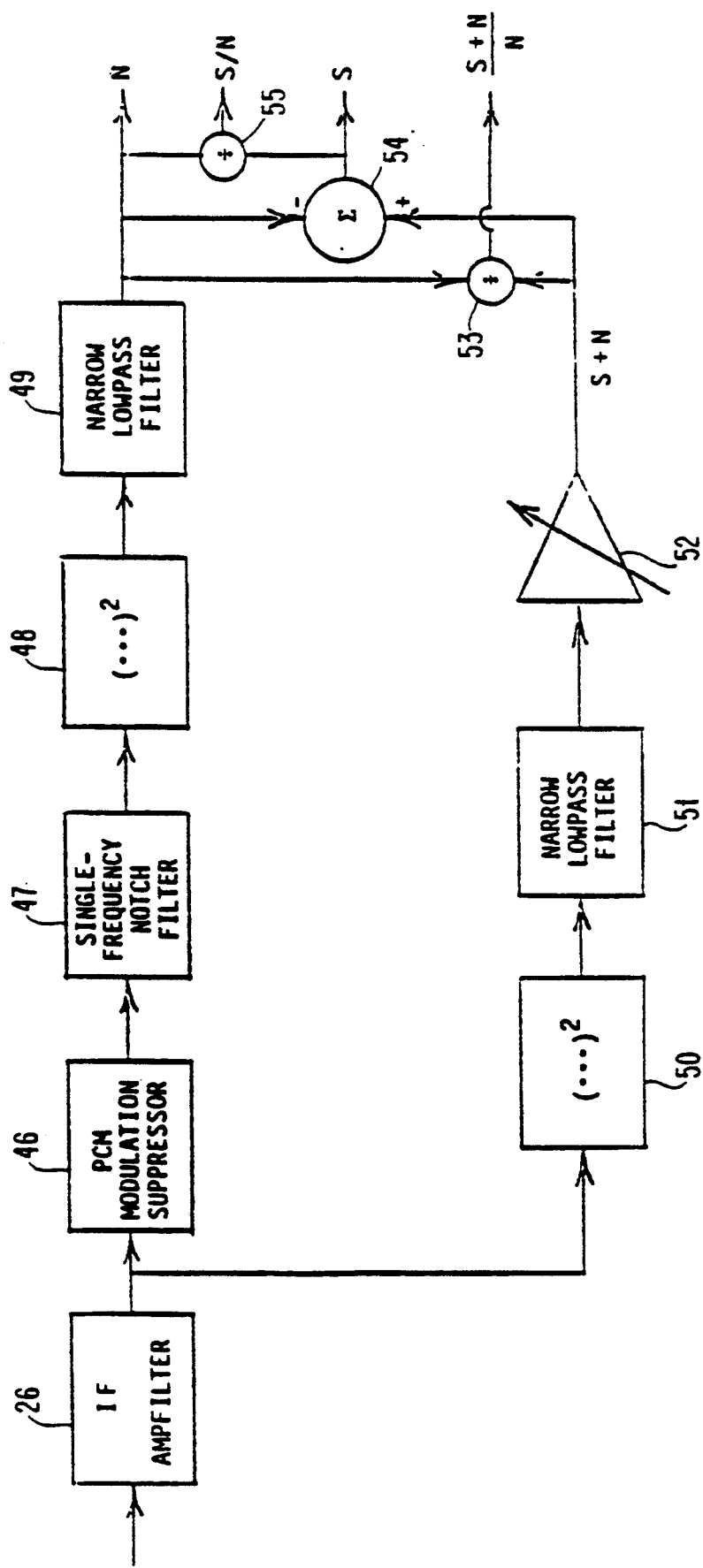
FIG. 6 is a block diagram embodiment of an alternative method for measuring the $(S/N)_{if}$ according to this invention.
Figure 7:
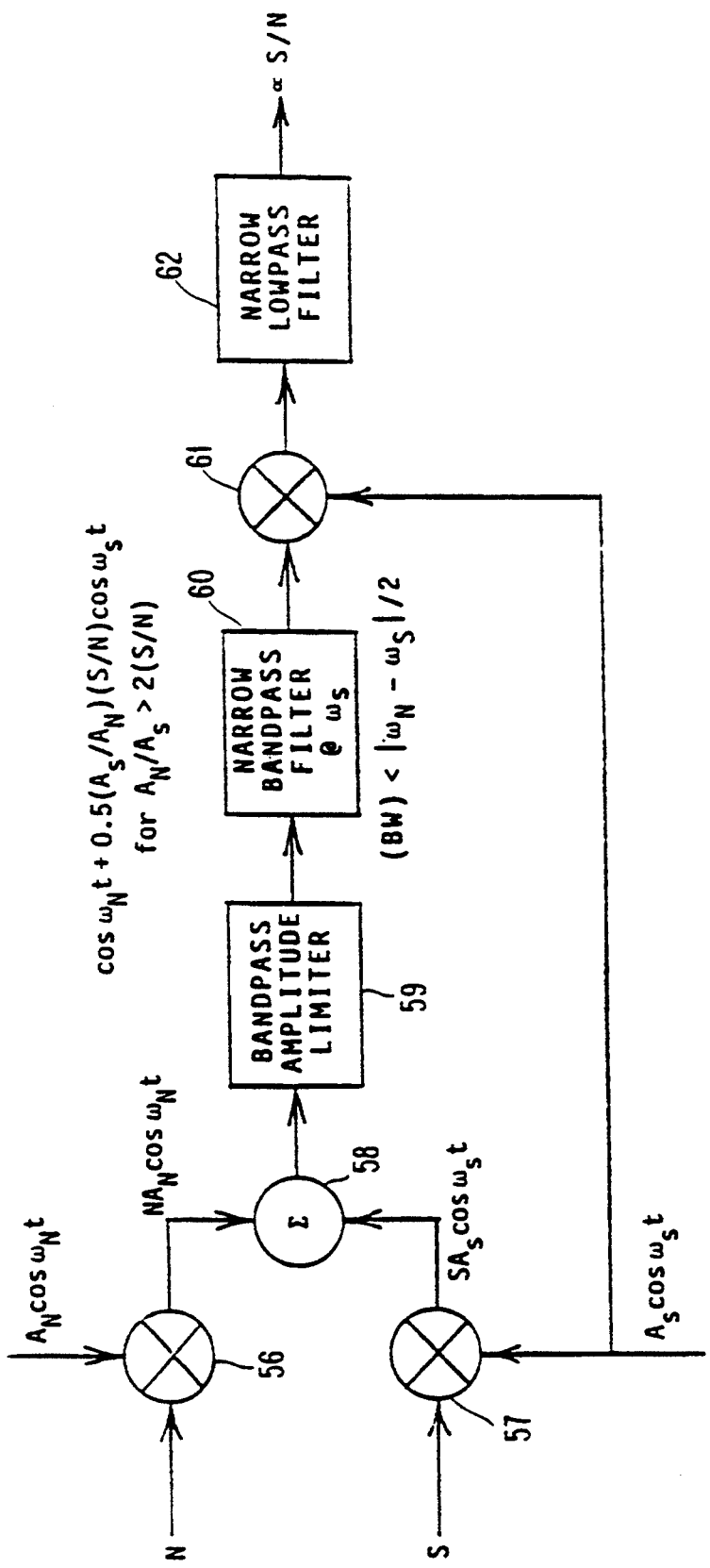
FIG. 7 is a block diagram of a method of determining the ratio of separately measured signal power and noise power in a scheme for measuring $(S/N)_{if}$ according to this invention.

A method, alternative to that of FIG. 2, for measuring the IF S/N ratio is shown in FIG. 6. Whereas the method of FIG. 2 deliberately causes the noise to modulate in 13 the phase of the sinewave $\cos\omega_0 t$ (that results from the PCM subtraction) in order to obtain the S/N ratio directly from the mean-square N/S of the resulting noise phase modulation $\phi_n(t)$, the method of FIG. 6 frequency-notches out the sinewave in the upper branch, blocks 46 through 49 to enable the measurement of the mean-square, N, of the noise, free of the signal; and measures in the lower branch, blocks 50, 51 and 52 the mean square, S+N, of the sum of the sinewave and attendant noise. The separately measured S+N and N are then combined in Divider 53, or in Subtractor 54 followed by Divider 55, to compute S/N. This computation can be performed either digitally, or by the analog method illustrated in FIG. 7. The method described in FIG. 7 capitalizes on the fact that the amplitude of the component in the output of the Bandpass Amplitude Limiter 60 at the frequency of the weaker of the two input sinewaves is equal very approximately (under the condition $A_N/A_S > 2(S/N)$ stated in FIG. 7) to the ratio of the amplitude $SA_S$ of the weaker sinewave to the amplitude $NA_N$ of the stronger sinewave at the limiter input.

Figure 8:
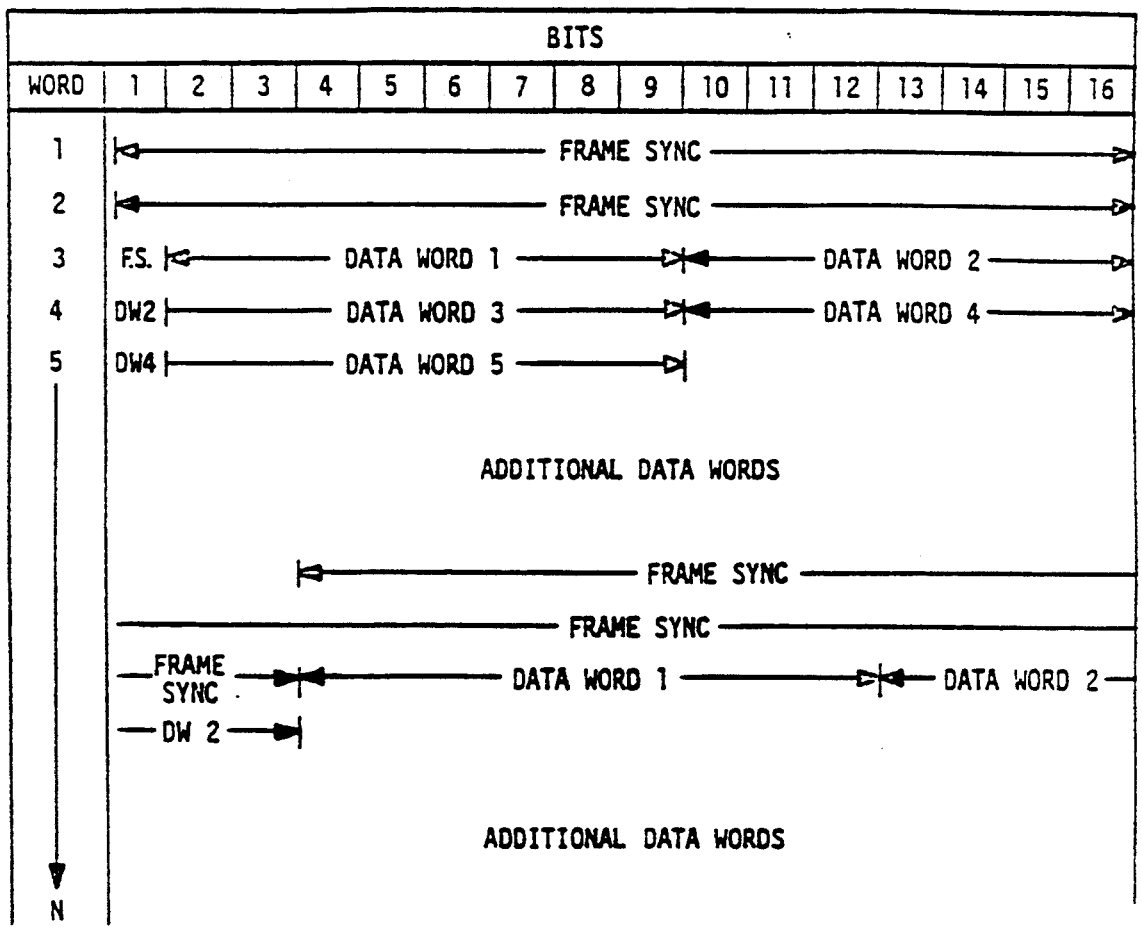
FIG. 8 is an illustration of assignment of memory storage space in a memory unit to each time interval position on the time axis, occupied by a bit, a word, a subframe, a frame, in a time-to-memory-space mapping according to this invention.
Figure 9:
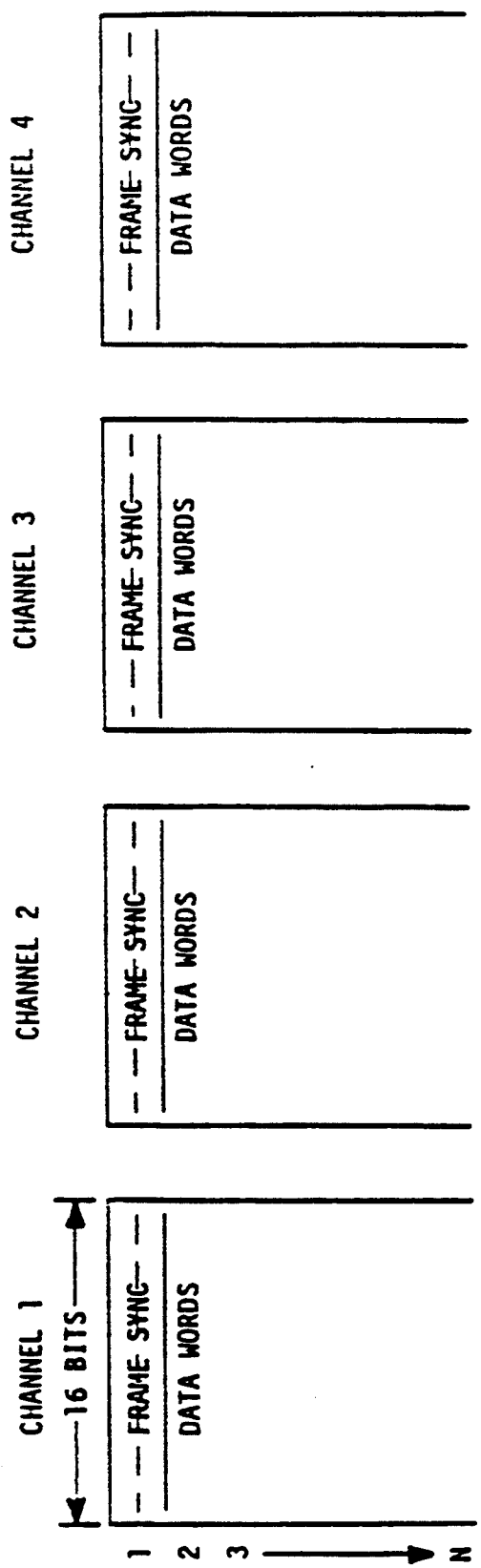
FIG. 9 is an illustrative arrangement of memory units to effect spatial alignment of variously delayed replicas of a PCM stream in a time-to-memory-space mapping of PCM streams according to this invention.
Figure 10:
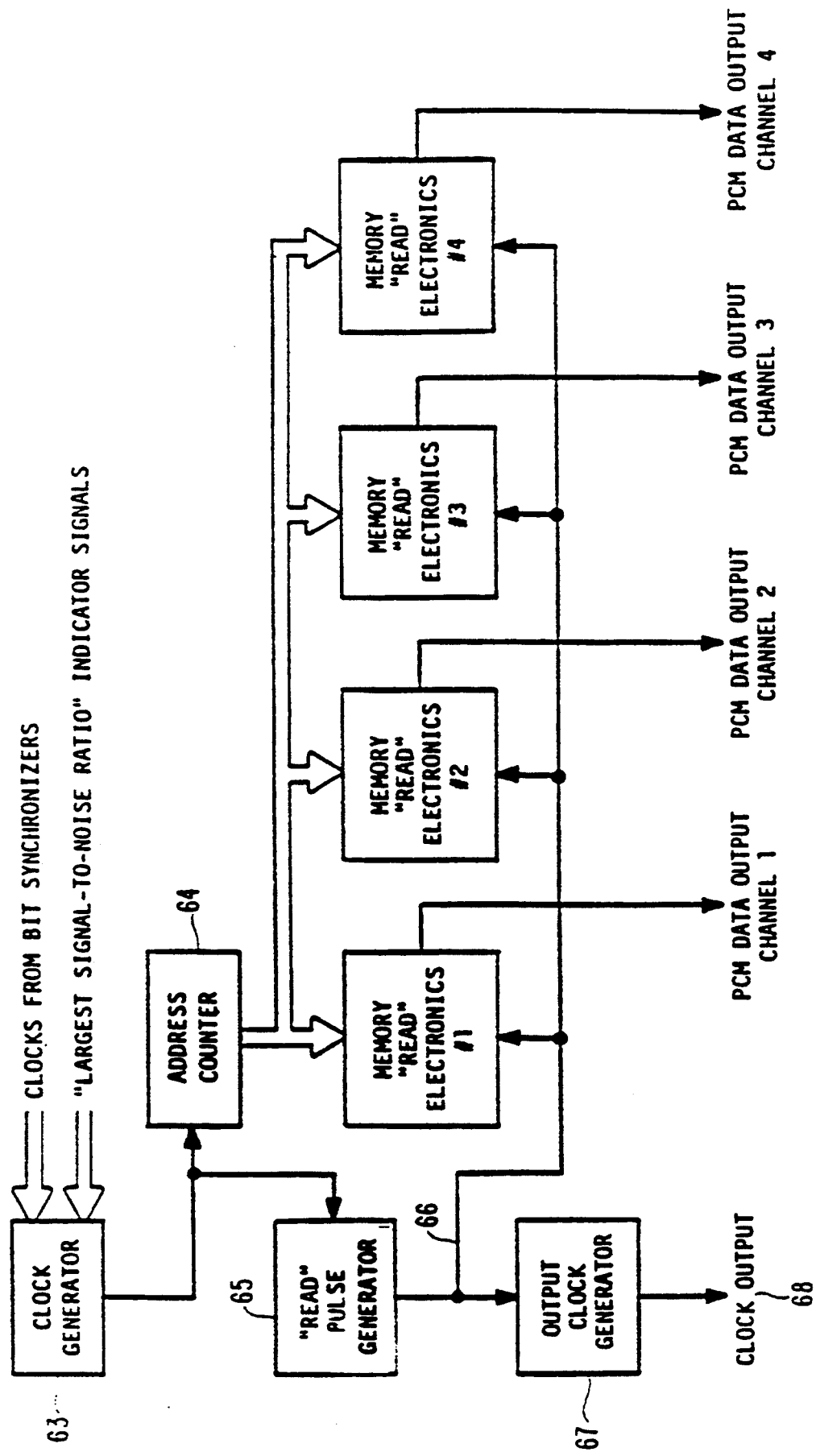
FIG. 10 is an illustrative block diagram embodiment of a time-to-memory-space mapping scheme according to this invention.

A unique approach to ensure output signal continuity in the merged output is to employ a Memory Unit in each signal channel, as in FIG. 1, and assign a unique position subspace in this Memory, as illustrated in FIG. 8, to each time interval (bit, word, subframe, frame) position on the input time axis. The arrival of a frame sync pulse initiates the routing of each word within the succeeding frame interval, upon the arrival of said word, into the memory space predesignated by said word's position within the time frame. The input bit streams may thus be mapped into separate Memory Units that are arranged as illustrated in FIGS. 9 and 10. The four bit streams shown are then said to be spatially aligned, since a bit (or word, frame, etc.) in a given space in memory is the same bit (or word, frame, etc.) for each of the four corresponding spaces in the Memory Units. FIG. 8 depicts the data as it might appear in each Memory Unit.

A particular bit (or word, frame, subframe) in the incoming stream is thus associated with a unique location in the memory space, whereas at the input it was associated with an instant or interval in time. The writing of incoming bit stream structures into memory in the above manner is a form of "mapping" which we call time-to-memory-space mapping.

Now, with the PCM bit streams mapped into their respective memory spaces, the misaligned input bit streams can be realigned in time by commanding the read-out of each word simultaneously out of the Memory Units of all signal channels by the same read-out pulse 66 as indicated in FIG. 10, applied to the memory space positions of that word within the various Memory Units. This synchronized read-out of the corresponding spaces of the various Memory Units constitutes a mapping from memory space back to the time domain. The output PCM streams are now aligned in both a) memory space occupancy, since the memory address or location being read is the same for each of the four memories, and b) time of commanded read-out, within some trivial logic propagation delay difference, since the "read" pulse is common to all four. The time synchronization/alignment achieved in this way is perfect (within some trivial logic propagation delay differences). In addition, the output clock, 68, since it is common to all simultaneous read operations, is perfectly synchronous with the output data irrespective of which data stream is ultimately selected, or the way in which all data streams are finally merged into one output stream.

Figure 11:
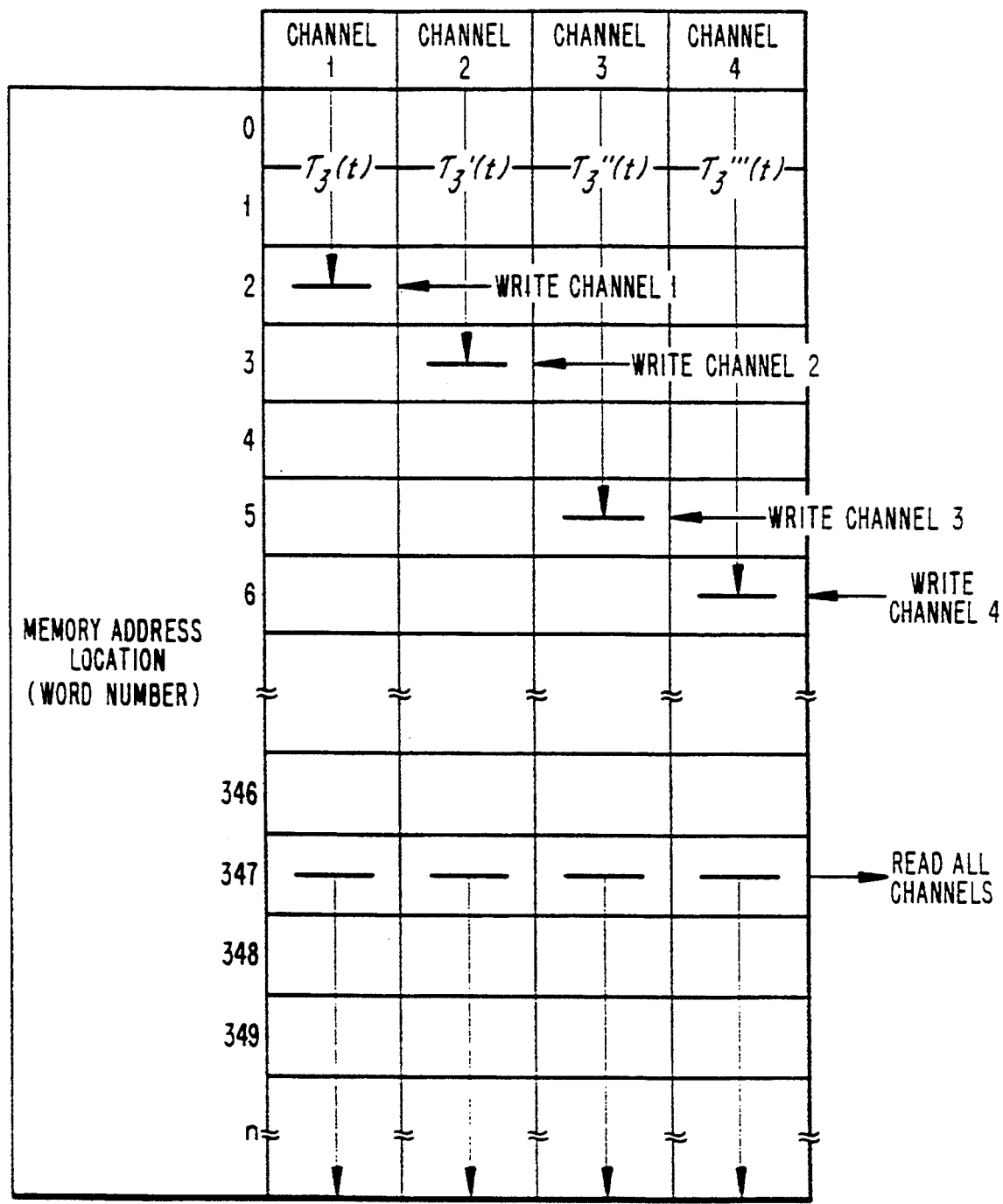
FIG. 11 is an illustrative description of mapping of a multiplicity of delayed replicas of the same PCM stream to effect their alignment in memory space according to this invention.

To recapitulate, the computation and implementation of compensatory delays are made in the Time-Space Mapping Subsystem in the Memory Unit shown in FIG. 1. With reference to FIG. 1, the input signals are first carrier-demodulated down to videoband 3, after which bit decisions for each channel are made in the bit synchronizers 4. The resulting serial PCM streams 5 are applied to frame synchronizers 4 where cross-correlation detection identifies the exact time of the start of each new frame. Frame synchronization pulses are thus generated, one for each channel, and the PCM stream 7 in each channel is clocked into the channel Memory Unit 8, as illustrated in FIG. 11. The frame sync pulses in each channel identify the beginning of each frame. The "time" of this beginning is converted to the start of a "space" frame by reading the first word after the frame sync pulse into memory address word "O" for each channel. In this way, each data word in one frame of memory corresponds identically, bit for bit, with the presumed same data words in the same address location for the other channels. In FIG. 11, for example, the data in address location 347 for Channel 1 corresponds identically with the data in address location 347 for Channel 2, and also identically with the data in address location 6 of Channels 3 and 4.

Words are thus written into memory continuously as they arrive asynchronously in time relative to other channels. At the instant of time depicted in the example of FIG. 11, the Channel 1 data word is being written into memory address location 2, the Channel 2 data word is being written into address location 3, the Channel 3 data word is being written into address location 5, and the Channel 4 data word is being written into address location 6. With each data word now occupying the same memory space predesignated to its time slot within the frame time, all channels can be read out simultaneously in (almost perfect) time alignment, as for example at memory address location 347. The system delay for Channel 1, designated $\tau_3(t)$, is represented by the time between writing the data word in memory address location 2 and reading that same word out. The system delay, $\tau_3'(t)$, for Channel 2 is represented by the time between writing the data word in memory address location 3 and reading that same word out. Similarly for Channels 3 and 4.

The time-to-memory-space mapping technique provides automatically for continuous PCM data output in terms of bit, word and frame rate through most conditions of signal loss and reacquisition, since the output is strobed by a local clock and the "read" operation continues even if the incoming data is lost. The reacquisition process after loss of signal on any input channel involves at most the loss of data on that channel from acquisition of signal to the first frame sync word. The potential exists for synchronizing the space domain by locating the frame sync word in memory space after the first mapping, rather than synchronizing in the time domain. If this latter implementation were chosen, the loss of data after acquisition of signal could conceivably be reduced arbitrarily close to zero. The reduction would be accomplished by "writing" all data into memory, and adjusting the "read" strobe of each channel relative to the other channels after locating frame sync for each. Another significant advantage is that timing information can be generated by a word counter on the output merged data stream. The contents of the word counter at the time of a periodic time tag will provide the "pointer" information. The pointer will be accurate to within plus or minus one-half of a word time; i.e., $$\text{Time Pointer Accuracy} < \pm \frac{(\text{Number of Bits per Data Word})/2}{\text{Bit Rate}}$$

The mapping of a data stream into a memory as indicated in FIGS. 8 and 11 is governed by a number of conditions; namely,
i) the use of sync information derived by the PCM frame synchronizer 6 to late the PCM data in a "known" way; i.e., the frame sync word is stored in the first X bit positions (X is the frame sync word length for the incoming signal format, 33 bits for the example in FIG. 8).
ii) An unspecified length N for the memory. The criterion for N involves only the maximum it ram (BR)$_{max}$ for PCM and the maximum differential delay, (ΔT)$_{max}$, between the incoming signals. The absolute minimum for N, N$_{min}$, is $$N_{min} \geq \frac{(\Delta T)_{max}(BR)_{max}}{16} \quad (9)$$

N$_{min}$, could be said to be (as the "Nyquist frequency" in a sampled data system is) theoretically sufficient but practically unusuable.
(iii) The "overflow" strategy of returning to the starting point and "writing over" the previous data. The system implementation (in particular the clock generator 66 shown in FIG. 10) will ensure that the "read" of a given bit in each memory will
Lag the longest delayed "write", and
Lead the "write" operation of new data of the minimum delayed signal.
Thus, no PCM data from any of the bit streams will be lost. The selection of N for the memory will be partially determined by the above considerations.
(iv) For nonambiguous alignment, the maximum difference between input PCM streams in either domain (time or memory space) must be limited to one-half of the space occupied by one frame; e.g., $$(\Delta T)_{max} < (FT)_{min}/2 \quad (10)$$

where
(ΔT)$_{max}$ = maximum delay difference between incoming PCM streams
(FT)$_{min}$ = minimum frame period Within this criterion, the PCM data can be properly mapped by locating the first frame sync word (after acquisition of all four signals simultaneously) of each data stream in a known location as indicated in FIG. 9, and measuring the time from the first frame sync pulse which arrives to each of the other three. If any sync pulse arrives as much as (½) (FT)$_{min}$ after the first, that sync pulse must be considered to initiate a new frame that succeeds those of the first reference sync pulse and those whose frame sync pulses followed the first reference sync pulse within a time delay interval of less than (½) (FT)$_{min}$. If it can be assumed that the maximum delay difference between the diversely received bit streams satisfies condition (10), then the just stated guideline should ensure a non-ambiguous alignment of frames in memory space.

According to condition (10), PCM data frame length must be at least twice the maximum delay difference between the first and last arriving streams. If the minor frame rate is too fast to meet this condition, the major frame rate will usually be acceptable. In this latter case, the frame synchronizer is simply programmed to accept the major frame sync code pattern instead of the minor frame sync pattern, and to accept the total number of PCM syllables per major frame instead of per minor frame. PCM syllable length may be programmed to process any frame length which is likely to be encountered by the system.

Figure 12:
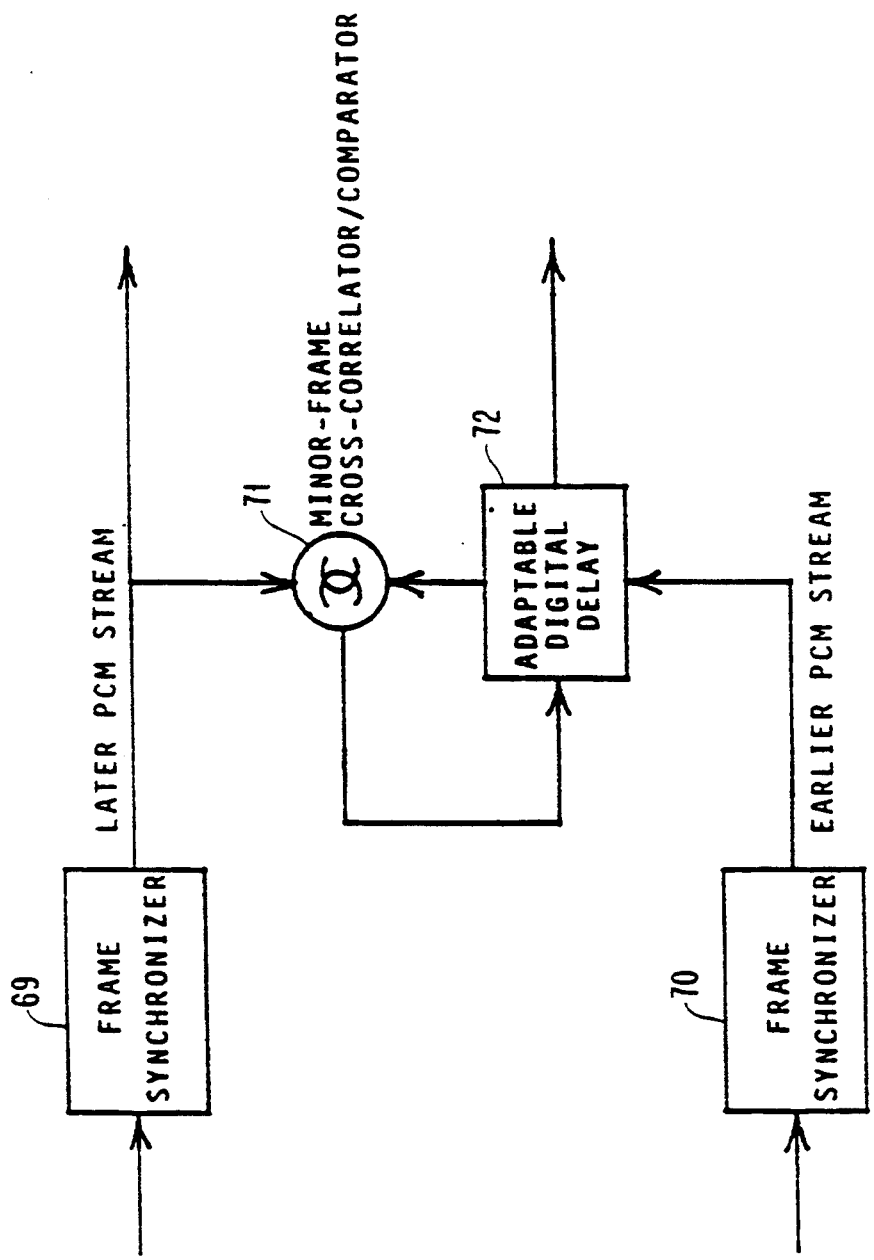
FIG. 12 is an illustrative block diagram description of a method of bringing an earlier and a later replica of the same PCM stream into near time-phase alignment according to this invention.

Reduction of initially excessive misalignment to within the bound of condition (10), and indeed full unambiguous alignment of PCM streams initially misaligned by an arbitrary amount relative to a frame length, can be automatically accomplished by the method illustrated in FIG. 12.

In FIG. 12, pairwise cross-correlation of entire minor frames (i.e., entire content between frame sync codes/pulses) of different PCM streams is employed to determined the mount of compensatory delay to be applied to a PCM stream from one station to bring it into alignment, or coincidence, in time with a later-arriving stream from another station. The cross-correlator 71 is basically a bit-by-bit comparator that counts the number of agreements or, preferably, disagreements.

The alignment process may be speeded up by employing precomputed estimates of the delay difference T$_d$, between pairs of incident PCM streams to determine the amount of time shift to introduce to one PCM stream to bring it into approximate alignment with another. Each pairwise delay-difference estimate need be computed only to an accuracy of no better than just less than one-quarter of a minor-frame length, T$_{mf}$. If for a given pair of incident PCM streams the estimated initial delay difference, T$_d$, is found to be equal to (an integer K + a fraction) times one-half of the minor-frame length, T$_{mf}$; then a first-iteration corrective shift of (K/2) frame lengths is introduced to the earlier arriving stream to bring it to within a residual/reduced delay difference, Δτ$_d$, of less than one-half of a frame length relative to the later-arriving PCM stream. In this way, initial pairwise delay differences in violation of condition (10) can be reduced to compliance with that condition in order to effect nonambiguous time-space mapping for perfectly aligned readouts. The resulting reduced time difference, Δτ$_d$, between the corresponding frame sync pulses of the two PCM streams may alternatively be counted and applied as a second (and final)-iteration corrective shift.

Figure 13:
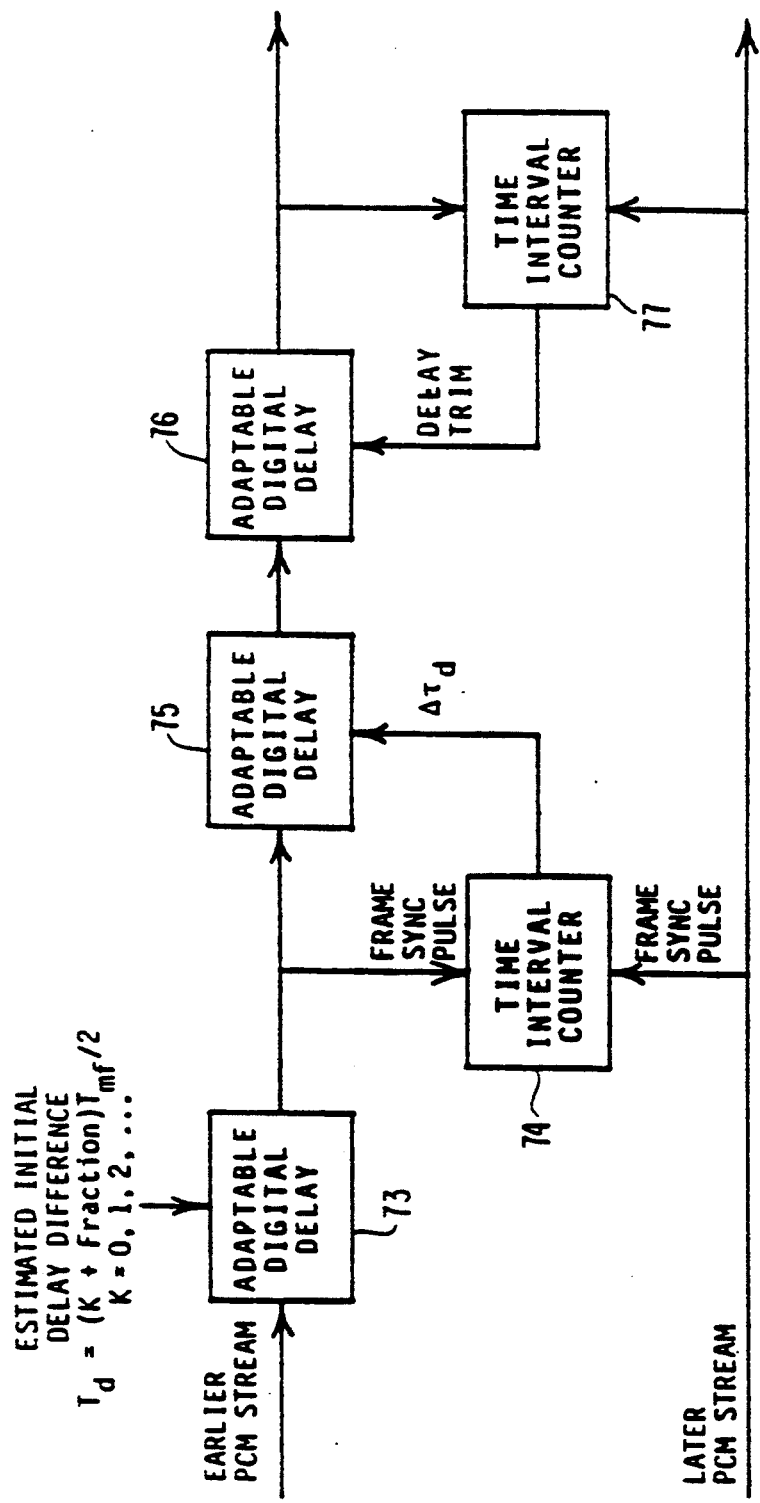
FIG. 13 is an illustrative block diagram description of an alternative method of bringing an earlier and a later replica of the same PCM stream into near-alignment according to this invention.
Figure 14:
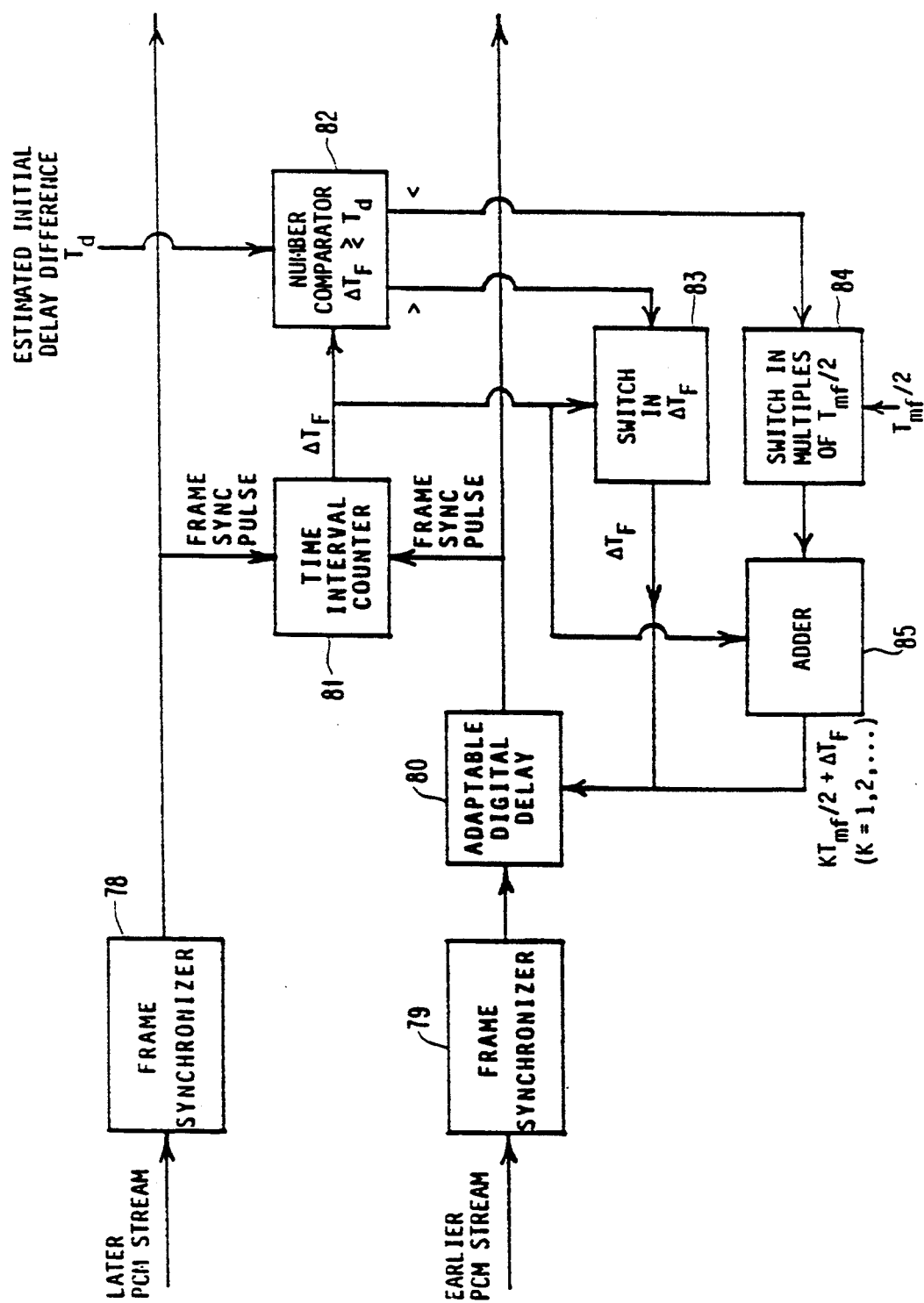
FIG. 14 is an illustrative block diagram description of another alternative method of bringing an earlier and a later replica of the same PCM stream into near-alignment according to this invention.

A method of implementing the use of an estimate of the initial delay difference to speed up nonambiguous time alignment is illustrated in FIG. 13. An alternative method is illustrated in FIG. 14, where the time separation ΔT$_F$ between a frame sync pulse of the earlier-arriving steam and the next-arriving frame sync pulse of the later-arriving stream is first counted in 81 and compared in 82 with the computed initial estimate, T$_d$, of the delay difference. With reference to FIG. 14 for clarification, the result of the comparison ΔT$_F$ $_>$$_<$ $_{Td}$ is:

If >, then ΔT$_F$ is applied by means of 83 to effect alignment;

If <, then successive $T_{mf}/2$ delays are applied by means of 84 until the remaining delay difference becomes less than $T_{mf}/2$, at which point the counted time difference between corresponding frame sync pulses is applied as a last-iteration correction through Adder 85.

For bit-stream combining, the approach is first to examine the outputs of the PCM bit synchronizers, after time alignment, in one bit time interval after another, and decide on a bit-by-bit basis. Suppose in an example of S/N's of 10.1 dB and 10 dB it is found that the 10.1 dB stream and one 10 dB stream show a "1" in a particular time slot, and the remaining 10 dB streams show a "0". One may choose to ignore the SNR values and apply an "unweighted or straight majority vote." A tie would be indicated and a "toss-up decision" (either 1 or 0) would be made, which would be subject to a $P_c$ or BER of $1.1 \times 10^{-5}$ (the average of two joint probabilities). If, however, one adds the S/N's of each subset in agreement, the result would be a numeric of 20.23 (=13.06 dB) for the "1" subset and 20 (=13.01 dB) for the "0" subset. Deciding on the basis of the greater sum of S/N's is a form of S/N weighting, and it results in the clear choice of "1", which would be subject to a $P_c$ or BER of $10^{-5}$ (the probability that both a 10.1 dB signal and a 10 dB signal would be jointly in error in the particular bit interval).

If any three of the preceding streams agreed in the bit time slot in question, a clear majority decision results without the weight of the S/N's and with it, with nearly the same $P_c$ of approximately $3 \times 10^{-8}$.

Consider, however, the case of four signals with IF S/N's of

|       | S/N, dB | S/N, Numeric | $P_e$, BER |
|-------|---------|--------------|------------|
| $S_1$ | 9       | 7.94         | $9.42 \times 10^{-3}$ |
| $S_2$ | 14      | 25.12        | $1.76 \times 10^{-6}$ |
| $S_3$ | 7       | 5.01         | $4.08 \times 10^{-2}$ |
| $S_4$ | 5       | 3.16         | $1.03 \times 10^{-1}$ |

In a particular bit time slot, let $S_1$, $S_3$, and $S_4$ read "1"

$S_2$ read "0"

Decision on a best signal basis would yield "0", with $P_c = 1.76 \times 10^{-6}$ Decision on a straight majority basis would yield "1" with $P_c = 4 \times 10^{-5}$ Decision on a "sum of S/N's" basis would yield "0" with $P_c = 1.76 \times 10_{-6}$ Thus, for all equal S/N's the majority vote and the weighted vote yield identical results. But, as the spread of SNR values increases, the majority vote loses advantage compared to the weighted vote. At some point in the spread of S/N values, the majority vote becomes less advantageous than the best signal selection criterion.

To formalize the weighted voting strategy, we first note that the relationship between the IF S/N and the PCM bit error probability is, for $(S/N)_{if}$ in excess of 4 dB, given approximately by $$P_e \simeq \frac{1}{2} e^{(S/N)_{if}/2}, \qquad (11)$$

for PCM/FM $$\simeq \frac{1}{2\sqrt{\pi}} \cdot \frac{1}{\sqrt{(S/N)_{if}}} e^{-(S/N)_{if}}, \qquad (12)$$

for PCM/$\phi$M

This shows that the $P_c$ or BER can be computed directly from the measured value of IF S/N, and is a monotonically decreasing function of it.

Now, if the bit error probabilities for k diverse replicas of the signal are denoted $P_{c1}, P_{c2}, \ldots, P_{ck}$, then the probability that any subset of the k signal replicas will be in error in the same bit position at the same time is given by the product of the individual probabilities of error of the subset, if the causes of error (the noise and other disturbances) are independent from one signal to the others. Thus, for PCM/FM, we observe Eq. (11) that the probability that signal replicas 1, 3, and 4 are in error in the same bit position at the same time, is given by $$P_1 P_3 P_4 \alpha e^{-\rho_1} e^{-\rho_3} e^{-\rho_4} = e^{-(\rho_1 + \rho_3 + \rho_4)} \qquad (13)$$

where $\rho = (S/N)_{if}$. If, in a set of four diverse replicas of the signal, replicas 1, 3 and 4 read the same binary logic symbol, say "1", in the same bit time slot, and replica 2 reads "0" in that bit slot, then if $$\rho_1 + \rho_3 + \rho_4 > \rho_2$$

a decision in favor of "1" is less likely to be in error than one in favor of "0", although $\rho_2$ may be greater than any of the other $\rho$'s. The same reasoning applies for PCM/$\phi$M, as can be readily seen from Eq. (12).

Based on the above reasoning, the weighted voting strategy for bit-by-bit decision is as follows:

Step 1: Inspect the time-aligned bit streams in the same bit position.

Step 2: Add the S/N ratios of each subset of signal replicas that read the same logic symbol.

Step 3: If the sum of S/N ratios for the subset that read "1" is greater than the sum for those that read "0", the decide in favor of "1"; otherwise, decide "0". If the two sums add up to the same number, then decide on the of a toss up.

The above steps are to be implemented in arithmetic logic, on a bit-by-bit basis, in the date merge section of the total system. It is important to note that the above decision approach is a powerful diversity combining technique that results in a substantial reduction in the detection probability of error. Indeed, the maximal (S/N)- sum voting strategy may be considered to be a form of quality weighted signal diversity combining in which the time-aligned bit streams are first grouped into those that read one binary symbol in a given bit time slot and those that read the other, the signals in each group are maximal-ratio combined to reduce the incoming diverse signals to two alterative resultants, and the two resultants are compared to decide in favor of the symbol represented by the greater resultant.

Figure 15:
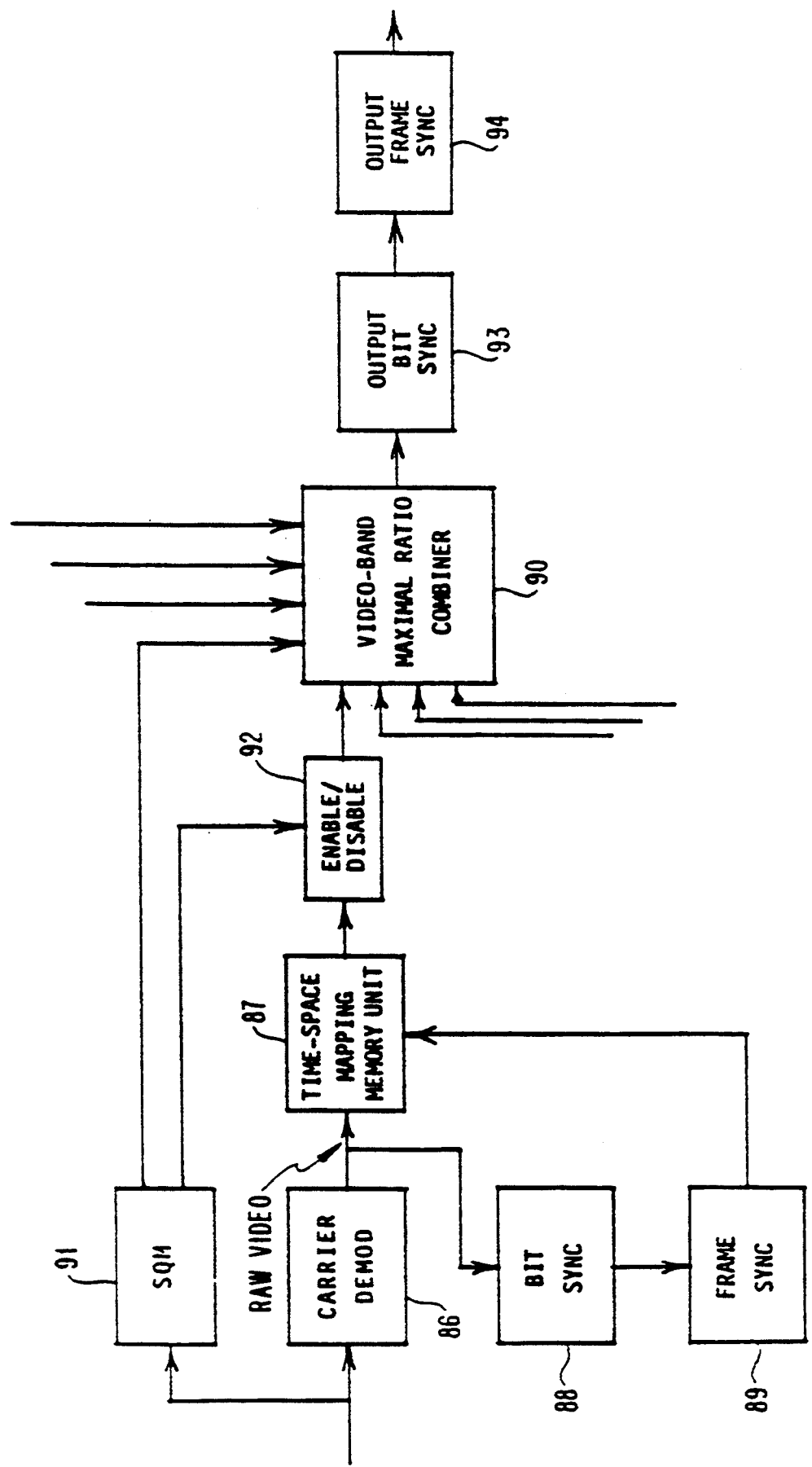
FIG. 15 is an illustrative description of a PCM videoband maximal ratio combining method according to this invention.

In the category of pre-digital-detection diversity bit decision techniques, we single out video-band maximal-ratio combing (VBMRC). The method for doing this is illustrated in FIG. 15.

The "carrier demodulator" 86 "raw video" output is first mapped in 87 from the time domain into memory space, timed by the output of a preliminary bit synchronizer 88 and frame synchronizer 89 sequence. The "raw" outputs of the various signal memory units are then read out in parallel, in near-perfect time-alignment, into a video-band bit-stream combiner 90. The results of IF S/N measurements in 91 of the various signals are also fed into the combiner, in which they are used to weight the level of each bit stream waveform in direct proportion to its IF S/N before they are all added together. An Enable/Disable, 92, block is shown in FIG. 15 for the purpose of inhibiting the introduction into the combiner of a signal when its IF S/N falls below the threshold of acceptable performance.

While there has been described what is at present considered to be representative embodiments of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. Apparatus for combining a multiplicity of diversely received replicas of the same digitally modulated signal wave carrying a video bit-stream waveform and originating in the same remote transmitter, comprising;
    a receiver means for separately receiving each of said diversely received replicas;
    means for measuring a predetection IF signal-to-noise power of each of said diversely received replicas of said digitally modulated signal wave within a predetection IF bandwidth of said receiver means;
    means for carrier-level demodulating each of said diversely received replicas of said signal wave to derive the video bit-stream-signal-plus-noise waveform available from each of said diversely received replicas;
    means for performing bit-by-bit detection of each of said video bit stream-signal-plus-noise waveforms to transform each of said video bit stream-signal-plus-noise waveforms into a sequence of digital bit symbols and aligning in time phase said sequences of digital bit symbols obtained from said bit-by-bit detection of said video bit stream-signal-plus-noise waveforms;
    means for formulating a decision index as a combination of results obtained by said measuring means and said bit-by-bit detection means; and
    means for outputting/selecting, within the time of occurrence of each of said bits, the bit symbol for which a corresponding decision index value is a maximum.

2. Apparatus of claim 1, wherein said measuring means further includes:
    means for suppressing carrier-level modulation of each of said diversely received replicas to obtain a corresponding unmodulated signal carrier plus attendant noise within said predetection IF bandwidth;
    means for selecting each said corresponding signal carrier plus attendant noise with a bandwidth that is smaller than said predetection IF bandwidth, and shifting its phase $\pi/2$ radians, to obtain a corresponding quadrature-phased carrier reference;
    means for amplitude-limiting a sum of each said unmodulated signal carrier plus attendant noise within said predetection IF bandwidth to obtain constant-envelope resultant;
    means for multiplying each said constant-envelope resultant with said corresponding quadrature-phase carrier reference, and for lowpass filtering a resulting product to detect a phase noise of said constant-envelope resultant; and
    means for measuring a mean-square of said detected phase noise.

3. Apparatus of claim 2, wherein said digitally modulated signal wave is PCM/$\phi$M, and said suppressing means further comprises:
    means for taking the square of the sum of said signal plus noise within said predetection IF bandwidth of said receiver means;
    means for separating the O-Hz component and the second-harmonic component of said square by using of a very narrowpass lowpass filter in parallel with a bandpass filter of bandwidth equal to said predetection IF bandwidth centered at the second harmonic of said predetection IF center frequency, and treating said second harmonic component as said unmodulated signal carrier in said suppressing, selecting, amplitude-limiting, multiplying and measuring the mean-square of detected phase noise of said constant-envelope resultant; and
    means for multiplying the output of said very narrowpass lowpass filter and the result of said mean-square of detected phase noise to obtain said predetection IF signal-to-noise power ratio.

4. Apparatus according to claim 2, wherein said digitally modulated signal wave is PCM/FM, and said suppressing means further comprises:
    means for branching out each of said diversely received replicas within each separate receiver means through two parallel signal channels, one and two, with substantially equal group delays, wherein said signal wave is passed through said channel one with negligible waveform distortion and only group delay introduced, yielding first channel output, and wherein each diversely received replica is passed through said channel two, wherein carrier-level demodulation is first performed, and said resulting video bit-stream plus noise waveform is then used to frequency-modulate a locally generated auxiliary carrier signal to reconstruct an auxiliary replica of said PCM/FM signal with substantially the same video modulation and a carrier frequency that is different from that of the pre-demodulation (or said IF) carrier frequency, yielding second channel output; and
    means for multiplying said first channel output and second channel output and selecting by filter means the component at the frequency difference in the resulting product.

5. Apparatus according to claim 2, wherein said digitally modulated signal wave is PCM/FM and said carrier-level demodulation and suppressing carrier-level modulation are both performed within a loop of a frequency-modulation-compressive feedback loop demodulator.

6. Apparatus according to claim 1, wherein said means for measuring the predetection IF signal-to-noise power ratio further comprises:
    means for branching out each of said diversely received replicas within each separate receiver means through two parallel signal channels, one and two, wherein said channel one suppresses said carrier-level modulation, notches out a resulting unmodulated signal carrier leaving only predetection IF noise, takes the square of said predetection IF noise and narrowpass lowpass filters said square, to yield first channel output, and wherein, said channel two performs the square of the sum of said predetection signal plus noise and narrowpass lowpass filters the result to yield second channel output; and means responsive to said first channel output and second channel output for computing said predetection IF signal-to-noise power ratio.

7. Apparatus according to claim 6, wherein said computing means further comprises:

means for multiplying the amplitude of a first sinsoidal carrier of a first frequency by said first channel output to obtain N-carrier;

means for multiplying the amplitude of a second sensoidal carrier of a second frequency by the difference between said first channel output and second channel output to obtain S-carrier;

means for adjusting said S-carrier amplitude to a level substantially below that of said N-carrier, and adding said N-carrier to said adjusted S-carrier to obtain their sum;

means for amplitude-limiting said sum and narrowpass selecting only the component at said S-carrier frequency in the result of said amplitude-limiting, which component will have an amplitude that is directly proportional to a ratio of the amplitude of said S-carrier to the amplitude of said N-carrier; and means for multiplying the output of said very narrowpass selecting with said second carrier in substantially the same phase and very narrowpass lowpass filtering the resulting product to obtain said predetection IF signal-to-noise power ratio.

8. Apparatus according to claim 6, wherein said means for measuring the predetection IF signal-to-noise power ratio further comprises:

means for subtracting said channel one output from said channel two output to obtain their difference; and means for dividing said difference by said channel one output.

9. Apparatus according to claim 1, wherein said bit-by-bit detection means further comprises:

synchronization means for establishing the starting time of each bit time slot relative to the time/clock reference of said receiver means and taking a number of substantially instantaneous samples of said video waveform within each said time slot; and means for taking the algebraic average of said sample values of each said time slot and outputting the digital bit symbol most closely indicated by said average.

10. Apparatus according to claim 1, wherein said formulating means formulates a decision index for each digital bit symbol in the code alphabet of said signal wave, and for each one and the same bit time slot, said formulating means further comprises:

means for adding the values of predetection IF signal-to-noise power ratio of all of said signal replicas for which said bit-by-bit detection yields the same digital bit symbol during said bit time slot, thus obtaining a set of such sums, one such sum corresponding to each digital bit symbol in said code alphabet during the bit time slot in which the digital bit outputs are examined.

11. Apparatus according to claims 1, wherein said performing means further comprises:

means for mapping each said sequence of digital bit symbols into a time versus memory space matrix.

12. Apparatus according to claim 1, wherein said performing means passes the latest-arriving of said sequences on without added delay, and passes each earlier-arriving sequence through a corresponding adjustable digital delay means, said performing means further comprising:

means for cross-correlating each sequence out of said adjustable digital delay means with said latest-arriving sequence; and means for using a result of said crosscorrelation as a control signal to adjust the delay through said corresponding digital delay means to bring about complete time phase or bit-by-bit alignment.

13. Apparatus according to claim 1, wherein said performing means passes the latest-arriving of said sequences on without added delay, and passes each earlier-arriving sequence through a succession of first and second adjustable digital delay means, said performing means further comprising:

means for presetting the delay through said first digital delay means by an a priori estimated value of initial delay difference between each earlier-arriving sequence and said latest-arriving sequence;

a time-interval counter means for measuring a time difference between contemporary frame synch-time position indicators belonging to an output of each of said first adjustable digital delay means and to said latest-arriving sequence, and for applying an output of said time-interval counter means to set a delay through said second adjustable digital delay means.

14. Apparatus according to claim 1, wherein said performing means passes the latest-arriving of said sequences on without added delay and, passes each earlier-arriving sequence through a succession of first, second and third adjustable digital delay means, said performing means further comprising:

means for presetting a delay through said first digital delay means by an a priori estimated value of an initial delay difference between each earlier-arriving sequence and said latest-arriving sequence;

first time-interval counter means for measuring a time difference between contemporary frame synch-time position indicators belonging to an output of each of said first adjustable digital delay means and to said latest-arriving sequence, and for applying an output of said first time-interval counter means to set a delay through said second adjustable digital delay means and passing the output of said second adjustable digital delay means through said third adjustable digital delay means;

a second time-interval counter means for measuring a time difference between near-contemporaneous frame synch-time position indicators belonging to an output of each of said second adjustable digital delay means and to said latest-arriving sequence, and for applying an output of said second time-interval counter means to set a delay through said third adjustable digital delay means.

15. Apparatus according to claim 1, wherein said performing means passes the latest-arriving of said sequences on without added delay and passes each earlier-arriving sequence through an adjustable digital delay means, said performing means further comprising:

- time-interval counter means for measuring a time difference between contemporary frame synch-time position indicators belonging to an output of each of said adjustable digital delay means and to said latest-arriving sequence; and
- means for comparing the result of said time-interval counter means measuring with an a priori determined estimate of initial delay difference between said sequences and, if said result is greater, switching said result into a feedback path to adjust said adjustable digital delay, but if less, adding to said result an integer multiple of some fraction of a frame duration and then applying the sum in feedback to adjust said adjustable digital delay.

16. Apparatus of video-band combining a multiplicity of diversely received replicas of the same digitally modulated signal wave originating in the same remote transmitter, each of said diversely received replicas being obtained by a separate receiver means, said apparatus comprising:

- means for measuring the predetection IF signal-to-noise power ratio of each of said replicas of said signal wave within the predetection IF band width of said receiver means;
- means for carrier-level demodulation of each of said replicas of said signal wave to derive a video bit-stream-signal-plus-noise waveform available from each of said replicas;
- means for operating on each of said video bit-stream-signal-plus-noise waveforms to derive from each its bit and frame timing/synchronization time markers relative to a time/clock reference of said receiver means;
- means for employing said frame synchronization time markers to align, in time phase, said video bit-stream-signal-plus-noise waveforms;
- means for weighing each of said video bit-stream-signal-plus-noise waveforms with said signal-to-noise power ratio for corresponding signal replicas, and summing the weighted and time-aligned video bit-stream-signal-plus-noise waveforms; and
- means for performing bit-by-bit detection of said sum to transform a resultant sum waveform into an output sequence of digital bit symbols.

* * * * *